REGENERATIVE REPEATER
Filed Dec. 8, 1949 3 Sheets-Sheet 1
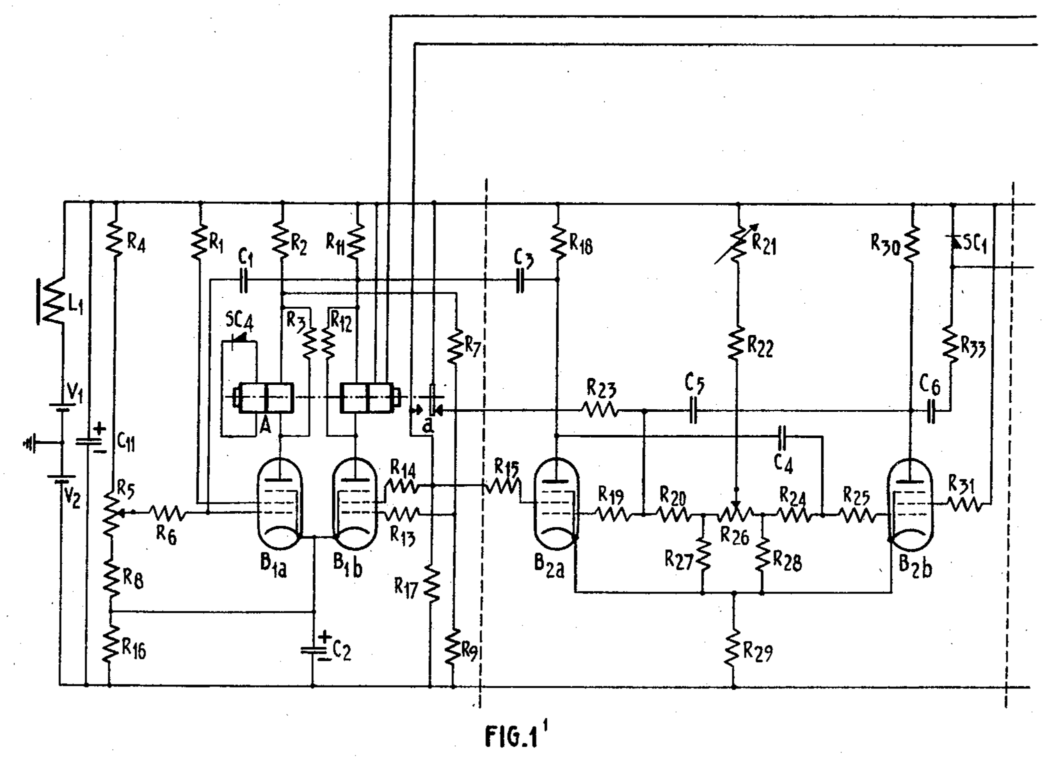
FIG.1¹
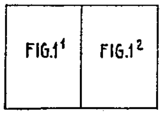
Inventors
Roelof Maarten Maria Oberman
and Antonie Snijders REGENERATIVE REPEATER
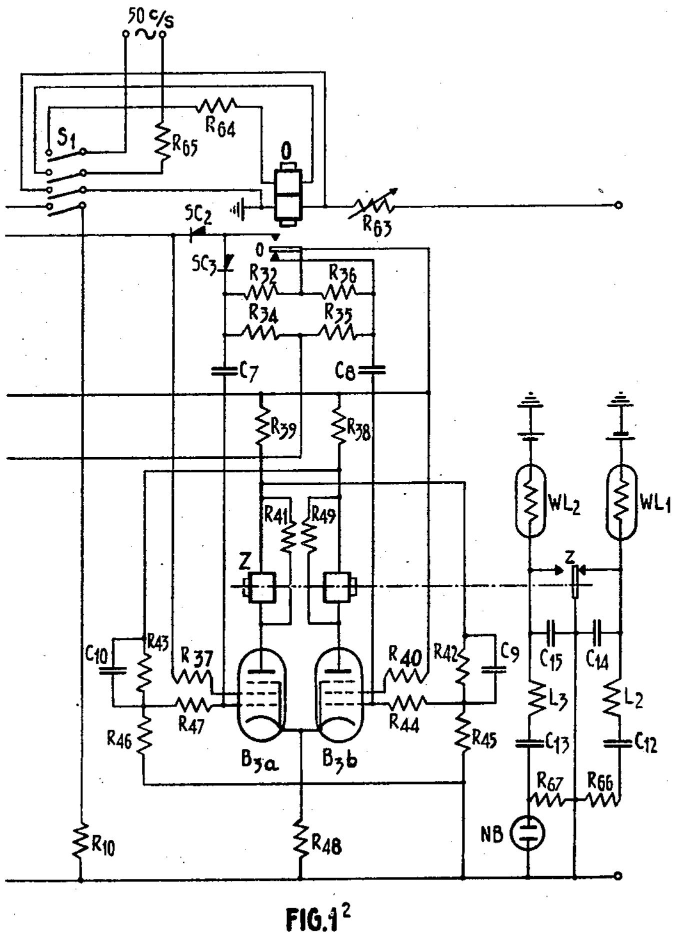
FIG.1[2]
Inventors
Roelof Maarten Marie Oberman
and Antonie Snijders
By ... Attorney June 3, 1952 R. M. M. OBERMAN ET AL 2,599,345

REGENERATIVE REPEATER

Filed Dec. 8, 1949 3 Sheets-Sheet 3

Inventors
Roelof Maarten Marie Oberman and
Antonie Snijders
By [signature]
Att.

Patented June 3, 1952 2,599,345

UNITED STATES PATENT OFFICE 2,599,345

REGENERATIVE REPEATER

Roelof Maarten Marie Oberman and Antonie Snijders, The Hague, Netherlands

Application December 8, 1949, Serial No. 131,742

11 Claims. (Cl. 178—70)

Figure 2:
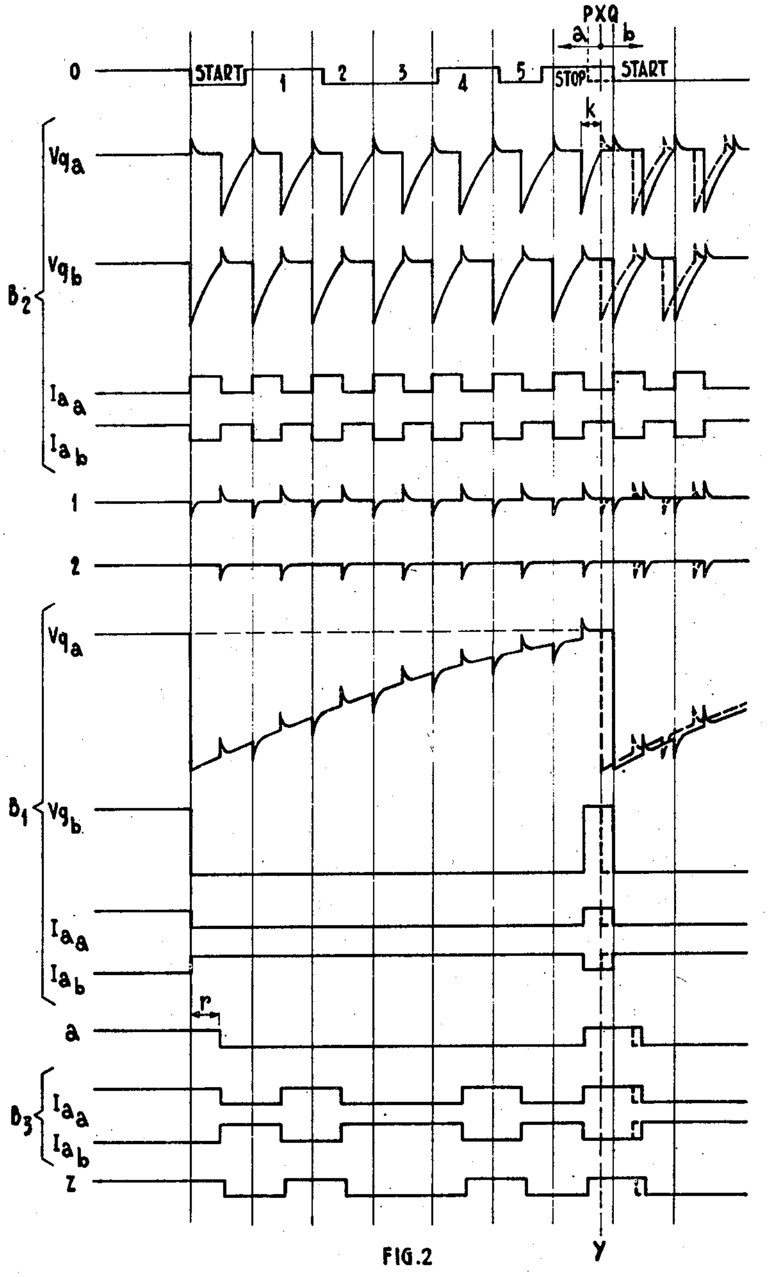

The invention relates to a regenerative repeater (code generator) for telegraph signals in a start-stop code as used for teleprinting.

In an intermediate station of a long transmission route a regenerative repeater receives distorted signals and uses them for controlling a transmitting device resending undistorted signals in the same direction along the transmission route.

The distortion is caused by advanced and delayed transitions between "mark" and "space" elements, or by a loss of the rectangularity of these transitions. The advanced and delayed transitions mainly occur in radio transmissions owing to echo phenomena, while the loss of rectangularity is caused in cables or the like. The regenerative repeater according to the invention, by means of short scanning impulses with constant intervals, uses only a short middle portion of each received code element and this avoids the distorted transitions.

The nature of the input code element defined by a scanning impulse, is transferred to a transmitting device having two stable positions. During the following interval the transmitting device maintains its position. Each subsequent scanning impulse ascertains whether the transmitting device should remain in the prevailing position, or whether it should be brought into the other stable position. In the regenerative repeater according to the invention belongs to the kind in which the intervals between the scanning impulses are given by a local time basis, the location of the regenerated signals is determined by the input signals so that the regenerated signals are started by the transitions between the stop and start element of the subsequent input signals, which are subject to distortion.

With the regenerative repeaters of this kind hitherto known in the art, the rigid application of the principle mentioned hereinabove results in irregularities in the sequence of the regenerated signals, corresponding to the accidental irregularities of the start-stop limits in the input code. As all the other code elements of the regenerated code are determined by the constant impulse intervals, it is only the stop elements in which the irregularities are accumulated. Particularly if a delayed input element is followed by an advanced signal, the intermediate stop of the regenerated signal pair can become so short that a following receiving device falls out of synchronism, especially in case of a new unfavorable distortion.

It has been proposed to overcome this drawback by transmitting the first code in the transmission series with a longer stop element having a duration of 30 instead of 20 msec., however, it is clear that with a series of regenerative repeaters very short stop elements may occur owing to an accumulation of distortions, although about 7% of the transmission speed is sacrificed.

Moreover, it has been suggested to adjust the time basis of the scanning impulses so that it is faster than the time basis of the preceding transmitting device so that the stop elements in the regenerated code are lengthened at the expense of all the other code elements, which, as a matter of fact, are shortened together with the intervals between the scanning impulses.

But for the loss of signalling speed this expedient in principle has the same drawbacks as the former one, though signals with stop elements that are longer than the start and combinations elements originate one station later The local time basis advance must be determined in accordance to the permissible transmission distortion; this has to be repeated cumulatively in case of a sequence of regenerative repeaters.

With the regenerative repeater according to the invention the mentioned drawbacks are overcome because the vibration generator contains a capacitor with a leakage resistor, arranged in such a manner that the charging condition of this capacitor admits the introduction of an impulse train only after the regenerated signal has been transmitted with a stop element of a certain minimum duration.

By the application of this expedient the second of two closely succeeding signals is delayed so that the intermediate stop element is given a minimum duration at the expense of one or more succeeding stop elements. The admissibility of this solution of the problem is based on the discovery that a congestion of input signals can only occur in combination with enlarged interspaces in other parts of the telegram while the average speed is not changed and remains equal to that of the original sender.

According to an embodiment of the invention the time constant of the relevant capacitor with leakage resistor in the vibration generator is calculated in such a manner that the lag between the last scanning impulse of an impulse train and the first impulse of the next impulse train is equal to the interval time in the impulse train. This embodiment can be used if the time basis of the regenerator is not slower than the time basis of the first sender. In order to allow an original sender to operate faster, the time basis of the regenerative repeater should be adjusted so as to be faster, however, this advance is restricted to the slight deviation which according to the recommendations of the C. C. I. T. (Comite Consulatif International Telegraphique) has a tolerance of ±¾%, while the transmission distortion is left entirely out of consideration. Moreover, in this case the time basis advance is not cumulative for a series of subsequent regenerative repeaters. If in this embodiment the C. C. I. T. tolerance of ¾% is to be maintained, the original sender device should meet a higher demand of accurateness, so that this sender and the first regenerative repeater together satisfy the relevant tolerances. If, e. g., the original sender operates ¼ too fast, the regenerative repeater should be allowed to operate ¼ faster than the sender, in order to obtain ¾% deviation from the standard in the regenerated code.

According to a preferred embodiment of the present invention the minimum delay between two impulse trains is chosen shorter than the interval time. A regenerative repeater according to this embodiment can, even without time basis advance, handle signals originating from a sender that is a little too fast. As a matter of fact, this embodiment involves the appearance of shortened stop elements in the regenerated code, but these elements are likewise restricted to a minimum duration, so that even in subsequent regenerative repeaters the shortening of the stop element is not cumulative.

When two widely interspaced signals are received by a regenerative repeater according to this embodiment, the second impulse train is not produced immediately after the lapse of time determined by the capacitor and resistance mentioned hereinbefore, but only after the arrival of the start element of the second signal.

The invention furthermore relates to a regenerative repeater of the kind described, having an arrangement of capacitors and resistances in the vibration generator which limits the stop elements of the regenerated code to a fixed minimum duration, the start-stop device comprises a relay and a diode or rectifier cell arranged in such a manner that this relay operates more slowly in one direction than in the other and therefore makes the regenerative repeater in the normal position insensitive to clicks of shorter duration than the operation time of the relay, which is predetermined according to the minimum stop element.

The predetermination of the minimum duration of the regenerated stop element also keeps the first scanning impulse of any impulse train apart from the beginning of the relevant start element of the input signal, so that any start element containing an initial part of a certain duration does not contain a scanning impulse.

If in the repeaters hitherto known in the art via the receiving device the vibration generator is operated by a faulty short interruption of the transmission, the generator generates a complete impulse train.

In the known regenerative repeaters this cannot be avoided in general, because there is always a chance of correct scanning in the beginning of the start element. The regenerative repeater according to this invention does not have this drawback; in case the vibration generator should be operated by clicks, it can be quickly restored to normal by means of the relay delayed in one direction before the first scanning impulse appears, provided the interference disappears in time.

The invention will be further explained with reference to the annexed drawings showing an embodiment adapted to a five-unit code with start and stop element, thus containing altogether seven elements per signal, each element of the ideal non-distorted code lasting 20 milliseconds, and consequently each signal 140 msec. It should however be understood that the invention is not restricted to this five-unit code.

Figs. $1^1$ and $1^2$ are together a diagram of a regenerative repeater according to the invention; and Fig. 2 is a plurality of graphs illustrating the operation of various parts of the regenerative repeater shown in Figs. $1^1$ and $1^2$.

Figs. $1^1$ and $1^2$ show from left to right three pairs of pentodes $B_{1a}$, $B_{1b}$; $B_{2a}$, $B_{2b}$; and $B_{3a}$, $B_{3b}$. In each pair the control grid of each tube is coupled crosswise with the anode of the other tube of the pair, but in each pair the coupling is of a different nature. In the right hand pair of tubes $B_{3a}$ and $B_{3b}$ the control grids are coupled over ohmic resistances with the opposite anodes. In consequence thereof this pair of tubes has two alternative stable conditions, i. e. one in which tube $B_{3a}$ and one in which tube $B_{3b}$ is conducting, at least when both screen grids are imparted positive voltage over resistances $R_{37}$ and $R_{40}$, respectively. If one of the supply voltages of the screen grid, for instance of the screen grid of tube $B_{3a}$, is interrupted, only one stable condition prevails with one tube $B_{3a}$ non-conducting and the other tube $B_{3b}$ conducting.

The input signal is received by the receiving relay O, the armature *o* of which in the shown normal condition interrupts the screen grid voltage for $B_{1b}$, $B_{2a}$, and $B_{3a}$. If the armature *o* is moved over by a start element and these three screen grid voltages are applied, tube $B_{3a}$ remains nonconducting. Only when a negative impulse reaches the top of a potentiometer formed by the resistances $R_{34}$ and $R_{35}$ from the tube $B_{2a}$, $B_{2b}$ as more fully explained hereinafter, part of it via capacitor $C_8$ reaches the control grid of the tube $B_{3b}$; as armature *o* has been moved over from the position shown in the drawing, resistance $R_{32}$ is short-circuited and capacitor $C_7$ does not receive a negative impulse. The impulse over capacitor $C_8$ renders tube $B_{3b}$ non-conducting so that the voltage drop in the series resistance $R_{38}$ is greatly reduced and the potential division over resistances $R_{38}$, $R_{43}$, $R_{46}$ is modified.

Now the control grid of $B_{3a}$ is imparted a higher voltage over resistance $R_{47}$ and tube $B_{3a}$ becomes conducting. The voltage drop across resistor $R_{39}$ increases and in the division over resistances $R_{39}$, $R_{42}$, $R_{45}$, the control grid voltage of tube $B_{3b}$ drops via resistor $R_{44}$, so that the new conducting condition is stabilized.

At a subsequent scanning impulse at the tap of the potentiometer $R_{34}$, $R_{35}$ it depends on the position of armature *o*, whether the present conducting situation of the tubes $B_{3a}$, $B_{3b}$ is maintained. During the course of the scanning impulse train the screen grid supply is taken over by the relay armature *a*, so that armature *o* becomes available for the changeover function in the device formed by armature *o* with resistances $R_{32}$, $R_{34}$, and $R_{36}$. The anode currents of tubes $B_{3a}$ and $B_{3b}$ flow through the respective windings of the polar transmitting relay Z.

The pair of tubes $B_{2a}$, $B_{2b}$, together with the auxiliary equipment more fully to be described hereinafter forms the vibration generator.

By the capacitive couplings $C_4$ and $C_5$ the conductivity of the tubes $B_{2a}$, $B_{2b}$ is alternated regularly as soon as both screen grids are fed with positive voltage over armatures *o* or *a*, and resistors $R_{15}$ and $R_{31}$, respectively.

In the normal condition tube $B_{2a}$ is non-conducting, but the voltage division over resistances $R_{21}$, $R_{22}$, $R_{26}$, $R_{27}$, $R_{28}$, and $R_{29}$ is so chosen that the operation of armature *o* by a start element and consequently the appearing of screen grid voltage immediately renders the tube $B_{2a}$ conducting. The negative voltage pulse through capacitor $C_4$ and resistance $R_{25}$ in consequence of the downward jump of the anode voltage of tube $B_{2a}$, renders tube $B_{2b}$ non-conducting and this fact causes a positive impulse to be imparted over capacitor $C_5$ and resistance $R_{19}$ to the control grid of tube $B_{2a}$. The negative charge of the control grid of tube $B_{2b}$ leaks off over the high ohmic resistance $R_{24}$, so that after some time tube $B_{2b}$ is rendered conducting again and the conductivity changes back.

The time constant of the system formed by capacitor $C_5$ and resistor $R_{20}$ plays a decisive part because the change is continued as long as tube $B_{2a}$ has positive screen grid voltage, first over armature *o*, afterwards over armature *a*. The two anode currents and the anode voltages have rectangular wave forms, and are in mutual counterphase. For a duration of 20 msec. per element the frequency is adjusted by resistance $R_{21}$ to 50 c./s.; resistance $R_{26}$ regulates the symmetry of the connection. When armatures *o* and *a* have both returned to normal, the circuit over resistance R causes a negative screen grid voltage so that tube $B_{2a}$ remains constantly non-conducting or becomes immediately non-conducting. By the jumps of the anode voltage of tubes $B_{2a}$, $B_{2b}$, positive and negative impulses are not only sent over capacitors $C_4$ and $C_5$ but also over capacitors $C_3$ and $C_6$.

The latter are in counterphase and succeed each other with intervals of 10 msec. The positive impulses over capacitor $C_6$ are diverted via the rectifier cell $SC_1$, so that only the negative impulses reach the transmitter as scanning impulses over the tap of the potentiometer $R_{34}$, $R_{35}$ of the changeover device. The first of these negative scanning impulses arrives 10 msec. after armature *o* has been moved by a start element; the subsequent scanning impulses have intervals of 20 msec. between one another.

The tubes $B_{1a}$, $B_{1b}$ are in a semi-stable condition because the anode of tube $B_{1a}$ is coupled with the control grid of tube $B_{1b}$ over one winding of relay A and resistor $R_3$ in parallel and resistances $R_7$ and $R_{13}$, while the coupling of the anode of tube $B_{1b}$ with the control grid of tube $B_{1a}$ is established over the other winding of relay A and resistor $R_{12}$ in parallel and the capacitor $C_1$. Thus tube $B_{1a}$ is normally conducting and tube $B_{1b}$ non-conducting, even when resistance $R_{14}$ over armatures *o* or *a* supplies screen grid voltage to tube $B_{1b}$. The changeover requires a negative voltage impulse originating from tube $B_{2a}$ over capacitor $C_3$ and $C_1$. After the negative charge on the control grid of tube $B_{1a}$ has leaked off over resistance $R_6$, so that this control grid reapproaches the positive voltage of the voltage divider formed by resistances $R_4$, $R_5$, $R_8$, $R_{16}$, the conductivity of tubes $B_{1a}$, $B_{1b}$ is changed back to the stable side. The high ohmic resistance $R_6$ and the capacitor $C_1$ are chosen so that the tube $B_{1a}$ is rendered non-conducting and thus the tube $B_{1b}$ remains conducting for 130 msec. Any readjustment is done by changing the position of the tap of resistance $R_5$, but absolute synchronism with the vibration generator is obtained by the voltage impulses over capacitors $C_3$, $C_1$, which are superposed as ripple on the control grid voltage of tube $B_{1a}$.

Immediately after armature *o* has been moved over, the first of the impulses has the negative sign, with the consequence described above, while after 130 msec. a positive impulse brings the control grid of tube $B_{1a}$ beyond the threshold value thereby rendering tube $B_{1a}$ conducting and tube $B_{1b}$ non-conducting. The intermediate positive and negative impulses are without effect on the conductivity of tubes $B_{1a}$ and $B_{1b}$.

The armature *a* of the polarized relay A follows the condition of conductivity of tubes $B_{1a}$, $B_{1b}$, the anode currents of which flow through the two main windings of relay A. At the start this happens with a delay of about 10 msec., because an extra winding of the start-stop relay A is short-circuited over the barrier cell $SC_4$. Thus a click moving over the relay armature *o* in less than 10 msec., is not taken over by armature *a* and the screen grid voltage of tube $B_{1b}$ and $B_{2a}$ becomes again negative, so that these two tubes become immediately non-conducting before a negative scanning impulse has been sent over capacitor $C_6$ to the transmitter. After a successful start and the completion of the 130 msec. mentioned before, the armature *a* returns without delay to normal and stops the generator. The seventh scanning impulse intended for the stop element coincides with this moment. Moreover, at this moment a negative impulse through capacitor $C_5$ and resistance $R_{19}$ passes to the control grid of tube $B_{2a}$.

During a certain time determined by the impedance values of capacitor $C_5$ and resistance $R_{20}$, a negative potential is maintained on the control grid of tube $B_{2a}$, so that this tube cannot become conducting, even if, shortly after the stopping of the generator, a new start element again imparts positive screen grid voltage over armature *o* and resistance $R_{15}$. Resistance $R_{23}$ could be omitted and the capacitor $C_5$ and resistor $R_{20}$ would maintain tube $B_{2a}$ non-conducting during exactly 10 msec. after the stop impulse; they also fix the half period of the rectangular voltages to 10 msec. It is, however, clear that this accumulation of functions is not a necessary limitation of the present invention.

If within 10 msec. after the stop impulse a new start element arrives, tube $B_{2a}$ does not become conducting before the expiration of the entire 10 msec. and consequently the regenerated signal has a duration of 140 msec. If the new input start element appears later than 10 msec. after the stop impulse, the tube $B_{2a}$ is ready to fulfill its function; after having reached the threshold value of the control grid voltage, tube $B_{2a}$ remains non-conductive until the screen grid voltage is switched on, and with this delay the finished regenerated signal has been extended to more than 140 msec. in total. When the local time basis is perfectly synchronous with the transmitter such a waiting process can occur only once or a few times, until the regenerative repeater lags behind the primary transmitter by a time period corresponding to the greatest delay of a start element that occurred.

If the time basis of the regenerative repeater is a little faster than that of the primary transmitter, there will repeatedly be short delays. The regenerative repeater cannot be adjusted so as to be slower than the primary transmitter without losing synchronism.

Another embodiment of the invention is derived from the former by the addition of the resistor $R_{23}$, inserted between the normal contact of the armature *a* of the start-stop relay A and the junction of capacitor $C_5$ and resistance $R_{20}$, owing to which the time constant of this group in the spacing period is shortened to say 8 msec., so that regenerated signals are issued of minimally 138 msec., viz. $6\times20$ for the start and combination elements, and 18 msec. for the stop element.

If the local time basis is perfectly synchronous with the transmitter, delays are encountered with almost all the signals. The average and most frequently occurring duration of the regenerated signals is 140 msec., with longer and shorter signals distributed in accordance with the theory of probability. With this embodiment the local time basis can be somewhat slower than the time basis of the primary transmitter without dropping synchronism; thus if the first six elements are somewhat lengthened, this may be compensated by the seventh (stop) element. The minimum duration of this stop element is only determined by the admitted speed difference, while the transmission distortion only appears in the distribution of longer and shorter stop elements over a greater period of time.

As the latter embodiment allows a relative freedom of time basis adjustment, it is possible to make use of locally available time devices, such as the power supply frequency for the adjustment or even for the operation of the impulse generator.

Fig. $1^2$ shows a quadripole key $S_1$ for adjusting of the vibration generator by means of a 50 c./s. standard frequency. The generator is brought to uninterrupted vibration and the standard frequency is conducted to an extra winding of the receiving relay I. The neon discharging lamp NB switched in by the key 5, shows a beat between both frequencies.

Furthermore Fig. $1^2$ shows the rectifier cells $SC_2$ and $SC_3$, which prevent certain undesirable couplings. The resistances $R_3$, $R_{12}$, $R_{41}$ and $R_{49}$ by-pass the windings of relay A and Z, respectively, and thus protect the screen grids when the relays A or Z are exchanged which would otherwise act as anodes. The resistances $R_{16}$, $R_{29}$ and $R_{48}$ apply the correct cathode voltages and the ripple filter consisting of resistor $L_1$ and capacitor $C_{11}$ protects the voltage sources $V_1$, $V_2$.

Fig. 2 shows various currents, voltages, and relay positions in the regenerative repeater according to Figs. $1^1$ and $1^2$. O represents the received input signal controlling the position of the armature o of the receiving relay O shown in Fig. $1^2$. The first "start" relates to the first signal of a message, so that it is assumed for this example that this first start is preceded by a stop period during which the transmitter sends a constant normal current over the line.

The two control grid voltages $V_{ga}$ and $V_{gb}$, and the two anode currents $I_{aa}$ and $I_{ab}$ for the vibration generator $B_{2a}$, $B_{2b}$ are indicated behind the symbol $B_2$.

The line 1 shows the positive and negative impulses which are sent over the capacitor $C_3$ to the start device $B_{1a}$, $B_{1b}$.

The line 2 shows the negative impulses which over capacitor $C_6$ and resistance $R_{33}$ and with cooperation of the rectifier $SC_1$ pass from the vibration generator $B_{2a}$, $B_{2b}$ to the change-over device for the transmission device.

The two control grid voltages $V_{ga}$ and $V_{gb}$, and the two anode currents $I_{aa}$ and $I_{ab}$ of the start-stop device $B_{1a}$, $B_{1b}$ are shown behind the symbol $B_1$.

The position of the armature *a* of relay A is shown behind the symbol *a*; it follows on the whole the anode currents $I_{aa}$ and $I_{ab}$ of the start-stop device, but in doing so it has for the elimination of clicks an operational delay in one direction, viz. when the armature *a* is moved over from spacing to marking, as a result of the short-circuiting of one winding of relay A by the rectifier SC4.

Behind the symbol $B_3$ the two anode currents of the change-over device $B_{3a}$, $B_{3b}$ are shown to which the operation of transmission relay Z corresponds with some delay as shown behind the symbol Z. The last three graphs show the shape of the regenerated signal. The graph of $V_{ga}$ of the pair of tubes $B_2$ shows the operation of the vibration generator. The latter is started by the input signal and then accomplishes its operation without being influenced by his signal. The moment when the generator is ready to react to a subsequent start is indicated by the line XY. This moment is fixed by the time constant of the group capacitor $C_5$ and resistors $R_{20}$, $R_{23}$, which after the moment "130," that is the moment at which the control grid voltage $V_{ga}$ for the seventh time becomes negative, brings about the shortened generator step.

If the start of the next input signal comes later than the moment indicated by the line XY for instance at the time indicated by the line Q in Fig. 2, the next impulse train is normally generated by the start of the input signal.

If, however, the start of the next input signal arrives earlier than the moment indicated by the line XY, for instance at the time indicated by line P in Fig. 2, the new impulse train is not generated directly by the new input start but first the moment indicated by the line XY is awaited. In this case the impulses follow the course indicated in the figure by dash lines.

The application of the invention is not restricted to a construction of the regenerative repeater or its parts as described in the before mentioned embodiment, but the receiving device, the change-over device, the transmission device, the vibration generator and the start-stop can be realized, electronically and/or electromechanically in various manners.

We claim:

1. In a regenerative repeater for telegraph signals including successive trains of impulses in a start-stop code, in combination, means receiving the impulses; a vibration generator connected to said receiving means so as to be started by the same on reception of the first train of impulses forming part of a telegraph signal; a transmission device retransmitting the signals received by said receiving means, said transmission device having two stable conditions assumed by the same, one at a time, under joint control of said receiving means and said vibration generator; a start-stop device electrically connected to the output of said vibration generator so as to be controlled by the same, said start-stop device including two tubes, one of said tubes being normally in conductive condition and the other of said tubes being normally in non-conductive condition, said tubes being mutually connected in a semi-stable relation; and switching means connected in the output of said start-stop device and controlling the operation of said vibration generator.

2. In a regenerative repeater for telegraph signals including successive trains of impulses in a start-stop code, in combination, means receiving the impulses; a vibration generator connected to said receiving means so as to be started by the same on reception of the first train of impulses forming part of a telegraph signal, said vibration generator including two tubes acting in counterphase, one of said tubes of said vibration generator being normally non-conductive; a transmitting device retransmitting the signals received by said receiving means, said transmitting device being adapted to assume any one at a time of two alternative stable conditions controlled by said receiving means and affected by said vibration generator; a start-stop device electrically connected to the output of said vibration generator so as to be controlled by the same, said start-stop device including two tubes in semi-stable relation, one of said tubes of said start-stop device being normally conductive and the other tube of said start-stop device being normally non-conductive, said two tubes of said start-stop device having each a control grid, said control grid of said normally conductive tube of said start-stop device being capacitively coupled to the anode of said normally non-conductive tube of said vibration generator; and switching means connected to the output of said start-stop device and controlling the operation of said vibration generator.

3. In a regenerative repeater for telegraph signals including successive elements, in a start-stop code, in combination, means receiving the elements of the signals; a vibration generator connected to said receiving means so as to be started by the same on reception of the first element forming part of a telegraph signal, said vibration generator including two tubes, one of said tubes of said vibration generator being normally non-conductive and the other being normally conductive, the conductivity of said tubes of said vibration generator alternating so as to generate rectangular pulses being in counterphase to each other; a transmitting device retransmitting the signals received by said receiving means, said transmitting device being adapted to assume any one at a time of two alternative stable conditions under the control of said receiving means and under the control of the transients produced by said vibration generator; a start-stop device electrically connected to the output of said vibration generator so as to be controlled by the same, said start-stop device including two tubes in semi-stable relation, one of said tubes of said start-stop device being normally conductive and the other tube of said start-stop device being normally non-conductive, said two tubes of said start-stop device having each a control grid, said control grid of said normally conductive tube of said start-stop device being capacitively coupled to the anode of said normally non-conductive tube of said vibration generator, whereby said vibration generator produces voltage pulses inverting the conductivity of said tubes of said start-stop device; and switching means connected to the output of said start-stop device and controlling the operation of said vibration generator independently of the condition of said receiving means.

4. In a regenerative repeater for telegraph signals including successive elements, in a start-stop code, in combination, means receiving the elements of the signals; a vibration generator connected to said receiving means so as to be started by the same on reception of the first element forming part of a telegraph signal, said vibration generator including two tubes; a plurality of capacitors and leakage resistors connected, respectively, in series between said tubes of said vibration generator rendering one of said tubes of said vibration generator normally non-conductive and the other normally conductive; a transmitting device retransmitting the signals received by said receiving means, said transmitting device being adapted to assume any one at a time of two alternative stable conditions predetermined by said receiving means, said transmitting device being affected by said vibration generator; a start-stop device electrically connected to the output of said vibration generator so as to be controlled by the same, said start-stop device including two tubes in semi-stable relation, one of said tubes of said start-stop device being normally conductive and the other tube of said start-stop device being normally non-conductive, said two tubes of said start-stop device having each a control grid, said control grid of said normally conductive tube of said start-stop device being capacitively coupled to the anode of said normally non-conductive tube of said vibration generator; a leakage resistance connected to said control grid of said normally conductive tube of said start-stop device whereby the conductivity of said tubes of said start-stop device is inverted by the first pulse produced by the starting of said vibration generator and is restored to normal after the negative potential of said control grids have been discharged gradually by said leakage resistances connected to said control grids, when one of the pulses produced by said vibration generator completes the discharging of said control grids at a sharply defined moment; and switching means connected to the output of said start-stop device and controlling the operation of said vibration generator.

5. In a regenerative repeater for telegraph signals including successive elements, in a start-stop code, in combination, means receiving the elements of the signals; a vibration generator connected to said receiving means so as to be started by the same on reception of the first element forming part of a telegraph signal, said vibration generator including two tubes; a plurality of capacitors and leakage resistors connected, respectively, in series between said tubes of said vibration generator and rendering one of said tubes of said vibration generator normally non-conductive and the other normally conductive so that said vibration generator produces rectangularly-shaped voltages; a transmitting device retransmitting the signals received by said receiving means, said transmitting device including two tubes each being adapted to assume any one at a time of two alternative stable conditions determined by the condition of said receiving means and affected under the control of said vibration generator, one of said tubes of said transmitting device being normally conductive and the other non-conductive in one of the two alternative stable conditions; a potentiometer having taps capacitively coupled with the control grids of said tubes of said transmitting device, respectively; a capacitive coupling between the anode of said normally conductive tube of said vibration generator and said potentiometer; a start-stop device including two tubes, one of said tubes of said start-stop device being normally conductive and the other non-conductive; a capacitive coupling between the control grid of said normally conductive tube of said start-stop device and the anode of said normally non-conductive tube of said start-stop device and the anode of said normally non-conductive tube of said vibration generator; a leakage resistance connected to said control grid of said normally conductive tube of said start-stop device, whereby the conductivity of said tubes of said start-stop device after having been inverted by the first voltage pulse of said vibration generator is restored to normal in response to said vibration generator producing the last of a predetermined number of impulses which suddenly completes the gradual discharge of the negative potentials of the control grids of said tubes of said start-stop device over said leakage resistances connected thereto; and switching means connected to the output of said start-stop device and controlling the operation of said vibration generator.

6. In a regenerative repeater for telegraph signals including successive elements, in a start-stop code, in combination, means receiving the elements of the signals; a vibration generator connected to said receiving means so as to be started by the same on reception of the first element forming part of a telegraph signal, said vibration generator including two tubes; a plurality of capacitors and leakage resistors connected respectively, in series between the anode of one of said tubes of said vibration generator and the control grid of the other of said tubes of said vibration generator and vice versa so as to affect said vibration generator by said receiving means after the lapse of a predetermined time period according to the charging condition of said capacitors; a transmitting device retransmitting the signals received by said receiving means, said transmitting device including two tubes each being adapted to assume any one at a time of two alternative stable conditions determined by the condition of said receiving means and affected under the control of said vibration generator, one of said tubes of said transmitting device being normally conductive and the other non-conductive in one of the two alternative stable conditions; a potentiometer having taps capacitively coupled with the control grids of said tubes of said transmitting device, respectively; a capacitive coupling between the anode of said normally conductive tube of said vibration generator and said potentiometer; a rectifier arranged for admitting only the negative transients of the impulses to said transmitting device; a start-stop device including two tubes in semistable relation with each other, one of said tubes of said start-stop device being normally conductive and the other non-conductive; a capacitive coupling between the control grid of said normally conductive tube of said start-stop device and the anode of said normally non-conductive tube of said start-stop device and the anode of said normally non-conductive tube of said vibration generator; a leakage resistance connected to said control grid of said normally conductive tube of said start-stop device, whereby the conductivity of said tubes of said start-stop device after having been inverted by the first voltage pulse of said vibration generator is restored to normal in response to said vibration generator producing the last of a predetermined number of impulses which suddenly completes the gradual discharge of the negative potentials of the control grids of said tubes of said start-stop device over said leakage resistances connected thereto; and switching means connected to the output of said start-stop device and controlling the operation of said vibration generator.

7. In a regenerative repeater for telegraph signals including successive trains of impulses in a start-stop code, in combination, means receiving the impulses; a vibration generator connected to said receiving means so as to be started by the same on reception of the first train of impulses forming part of a telegraph signal, said vibration generator including two tubes acting in counterphase, one of said tubes of said vibration generator being normally non-conductive; a transmitting device retransmitting the signals received by said receiving means and regenerating the same under control of said vibration generator; a start-stop device electrically connected to the output of said vibration generator so as to be controlled by the same, said start-stop device including two tubes in semi-stable relation, one of said tubes of said start-stop device being normally conductive and the other tube of said start-stop device being normally non-conductive, said two tubes of said start-stop device having each a control grid, said control grid of said normally conductive tube of said start-stop device being capacitively coupled to the anode of said normally non-conductive tube of said vibration generator; switching means connected to the output of said start-stop device and controlling the operation of said vibration generator independently of the condition of said receiving means; and additional means for delaying the operation of said switching means in one direction thereof.

8. In a regenerative repeater for telegraph signals including successive trains of impulses in a start-stop code, in combination, means receiving the impulses; a vibration generator connected to said receiving means so as to be started by the same on reception of the first train of impulses forming part of a telegraph signal, said vibration generator including two tubes acting in counterphase, one of said tubes of said vibration generator being normally non-conductive; a transmitting device retransmitting the signals received by said receiving means and regenerating the same under control of said vibration generator; a start-stop device electrically connected to the output of said vibration generator so as to be controlled by the same, said start-stop device including two tubes in semi-stable relation, one of said tubes of said start-stop device being normally conductive and the other tube of said start-stop device being normally non-conductive, said two tubes of said start-stop device having each a control grid, said control grid of said normally conductive tube of said start-stop device being capacitively coupled to the anode of said normally non-conductive tube of said vibration generator; a switching relay connected to the output of said start-stop device and controlling the operation of said vibration generator independently of the condition of said receiving means; and means including a rectifier for delaying the operation of said switching relay in one switching direction thereof.

9. In a regenerative repeater for telegraph signals including successive series of impulses in a start-stop code, in combination, a receiving relay having an armature; a vibration generator including two tubes, one of said tubes of said vibration generator being normally conductive and the other of said tubes of said vibration generator being normally non-conductive, said vibration generator being connected to said armature of said receiving relay so that said armature of said receiving relay modifies the screen grid voltage of said normally non-conductive tube of said generator directly upon reception of the first of a series of impulses forming part of the telegraph signal; a transmitting device adapted to assume any one at a time of two alternative stable conditions predetermined by the position of said armature of said receiving relay and controlled by said vibration generator; a start-stop device including two tubes in semi-stable relation to each other, one of said tubes of said start-stop device being normally conductive, the other of said tubes of said start-stop device being normally non-conductive; a capacitive coupling between the control grid of the normally conductive tube of said start-stop device and the anode of said normally non-conductive tube of said vibration generator; a polarized switching relay connected to the output of said start-stop device and having an armature controlling the operation of said vibration generator by applying a screen grid voltage to said normally non-conductive tube of said vibration generator independently of the position of said armature of said receiving relay; and means adapted to said polarized switching relay for delaying the operation thereof in one switching direction whereby the regenerative repeater in the normal condition thereof is rendered insensitive to clicks having a shorter duration than that determined by said means.

10. In a regenerative repeater for telegraph signals including successive series of impulses in a start-stop code, in combination, a receiving relay having an armature; a vibration generator including two tubes, one of said tubes of said vibration generator being normally conductive and the other of said tubes of said vibration generator being normally non-conductive, said vibration generator being connected to said armature of said receiving relay so that said armature of said receiving relay modifies the screen grid voltage of said normally non-conductive tube of said generator directly upon reception of the first of a series of impulses forming part of the telegraph signal; a transmitting device adapted to assume any one at a time of two alternative stable conditions predetermined by the position of said armature of said receiving relay and controlled by said vibration generator; a start-stop device including two tubes in semi-stable relation to each other, one of said tubes of said start-stop device being normally conductive, the other of said tubes of said start-stop device being normally non-conductive; a capacitive coupling between the control grid of the normally conductive tube of said start-stop device and the anode of said normally non-conductive tube of said vibration generator; a polarized switching relay having two windings and connected to the output of said start-stop device and having an armature controlling the operation of said vibration generator by applying a screen grid voltage to said normally non-conductive tube of said vibration generator independently of the position of said armature of said receiving relay; and means including a rectifier connected in series with one of said windings of said switching relay, said means being adapted to said polarized switching relay for delaying the operation thereof in one switching direction whereby the regenerative repeater in the normal condition thereof is rendered insensitive to clicks having a shorter duration than that determined by said means.

11. In a regenerative repeater for telegraph signals including successive series of impulses in a start-stop code, in combination, a receiving relay having an armature; a vibration generator connected to said receiving means so as to be started by the same on reception of the first element forming part of a telegraph signal, said vibration generator including two tubes; a plurality of capacitors and leakage resistors connected, respectively, in series between the anode of one of said tubes of said vibration generator and the control grid of the other of said tubes of said vibration generator and vice versa so as to affect said vibration generator by said receiving means after the lapse of a certain time period; a transmitting device retransmitting the signals received by said receiving means and adapted to assume one of two stable conditions under the control of said receiving means and of said vibration generator; a start-stop device electrically connected to the output of said vibration generator and controlled thereby, said start-stop device including two tubes, one of said tubes of said start-stop device being normally conductive and the other non-conductive, said tubes of said start-stop device being connected with each other so as to be in semi-stable relation; a switching relay connected to the output of said start-stop device and controlling the operation of said vibration generator independently of the condition of said receiving means; means adapted to said switching relay for delaying the operation thereof in one switching direction; and a rest contact connected to one of said capacitors of said vibration generator, whereby said armature of said receiving relay modifies the charging position of said capacitor connected thereto, thereby changing the time period during which said vibration generator cannot be started by said receiving means.

ROELOF MAARTEN MARIE OBERMAN.
ANTONIE SNIJDERS.

REFERENCES CITED

The following references are of record in the file of this patent:

UNITED STATES PATENTS

| Number | Name | Date |
|---|---|---|
| 2,406,096 | Morrison | Aug. 20, 1946 |
| 2,430,547 | Anderson et al. | Nov. 11, 1947 |
| 2,454,089 | Rea | Nov. 16, 1948 |
| 2,474,490 | Pelle | June 28, 1949 |